United States Patent [19]

Sumi et al.

[11] Patent Number: 4,753,845
[45] Date of Patent: Jun. 28, 1988

[54] MULTI-LAYER POLYMERIC STRUCTURE

[75] Inventors: Takehiko Sumi; Kazuya Matsumoto, both of Kanagawa, Japan

[73] Assignee: Kyoraku Co., Ltd., Tokyo, Japan

[21] Appl. No.: 3,959

[22] Filed: Jan. 16, 1987

[30] Foreign Application Priority Data

Jan. 30, 1986 [JP] Japan .................................. 61-18854
Feb. 26, 1986 [JP] Japan .................................. 61-39296
Aug. 4, 1986 [JP] Japan .................................. 61-181973

[51] Int. Cl.$^4$ ...................... B32B 5/16; B32B 27/00; B32B 27/08
[52] U.S. Cl. ...................... 428/327; 428/516; 428/518; 428/412; 428/483
[58] Field of Search ................. 428/516, 518, 327, 35

[56] References Cited

U.S. PATENT DOCUMENTS

| 4,425,410 | 1/1984 | Farrell et al. | 428/516 |
| 4,464,443 | 8/1984 | Farrell et al. | 428/688 |
| 4,565,738 | 1/1986 | Purdy | 428/516 X |
| 4,621,014 | 11/1986 | Lu | 428/516 X |

FOREIGN PATENT DOCUMENTS

| 47-23353 | 11/1972 | Japan . |
| 55-132242 | 10/1980 | Japan . |
| 57-170748 | 11/1982 | Japan . |
| 58-98251 | 6/1983 | Japan . |
| 61-11339 | 1/1986 | Japan . |

Primary Examiner—George F. Lesmes
Assistant Examiner—D. R. Zirker
Attorney, Agent, or Firm—Ronald P. Kananen

[57] ABSTRACT

A multi-layer polymeric structure useful for packages comprises at least one protective layer of hydrophobic resin and at least one layer of water-sensitive oxygen barrier resin. This multi-layer polymeric structure is characterized by incorporating in the oxygen barrier layer at least one macromolecular compound selected from the group consisting of high polymers of a three-dimensional network structure containing hydrophilic groups and water-soluble macromolecular compounds containing ionizing groups.

Optionally, the oxygen barrier layer and the protective layer may be joined through the medium of an additional layer of adhesive resin in a laminated form.

6 Claims, 1 Drawing Sheet

FIG. 1

FIG. 2

MULTI-LAYER POLYMERIC STRUCTURE

BACKGROUND OF THE INVENTION

1. Field of the Invention

This invention relates to a multi-layer structure useful for packages, and more particularly relates to a multi-layer structure which is capable of retaining an oxygen barrier property satisfactorily in spite of aging, excellent in the ability to preserve wrapped contents such as foodstuffs and medicines, and useful for various packaging applications.

2. Description of the Prior Art

Oxygen barrier resins such as saponified ethylene-vinyl acetate copolymer (hereinafter referred to as "EVOH") have low oxygen permeability and yet high humidity dependency and, therefore, are liable to suffer from a notable increase of oxygen permeability under a highly humid atmosphere. Generally, packaging structures, therefore, are adapted to retain the oxygen barrier property thereof by laminating a protective layer, such as of polyethylene having a low water absorption or low moisture absorption on a layer of an oxygen barrier resin of high humidity dependency thereby precluding direct exposure of the oxygen barrier layer to water or moisture (as disclosed in Japanese Utility Model Application KOKAI (laid open to public inspection) No. 47(1972)-23,353 for example). Under the conditions of high humidity and high temperature as in the treatment in a retort for sterilization, however, the polyethylene itself protecting the oxygen barrier layer gains in the moisture absorption and notably increases the moisture permeability thereof and, as the result, the moisture permeating the protective layer passes into the oxygen barrier layer and seriously jeopardizes the oxygen barrier property of such packaging structures.

For the purpose of eliminating the drawback mentioned above, it has been proposed to repress the passage of permeating moisture into the oxygen barrier by incorporating a water-absorbing substance in the aforementioned protective layer or adhesive intermedite layer thereby relying on the layer incorporating therein this water-absorbing substance to absorb the permeating moisture en route to the oxygen barrier layer. The specification of Japanese Patent Application KOKAI No. 57(1982)-170,748, for example, discloses an idea of providing a layer incorporating therein a drying agent such as an inorganic compound like calcium chloride or a saccharide like sucrose for a laminated structure containing an oxygen barrier layer of such a water-sensitive polymer as EVOH thereby protecting the oxygen barrier layer of the water-sensitive polymer against moisture. In the multi-layer structure provided with such a drying agent-incorporating layer as mentioned above, however, despite the incorporation of the drying agent in the resin forming the inner and outer layers or in the adhesive layer, the drying agent is so deficient in water absorption property that it is actually difficult to produce a multi-layer structure possessing as high oxygen barrier property as expected unless the drying agent is used in a large amount. The incorporation of the drying agent in an excess amount in the resin forming the aforementioned layer for the purpose of improving the water absorbing effect entails a disadvantage that the characteristic properties such as, for example, transparency and physical strength which are possessed by the resins forming the component layers of the structure will be impaired.

The specifications of Japanese Patent Application KOKAI No. 58(1983)-98,251 and No. 61(1986)-11,339 disclose an idea of interposing between a gas barrier layer and inner and outer surface layers of moisture-proof resin intermediate layers having highly water-absorbing resin particles dispersed in film-formable and particularly thermally formable resin. The highly water-absorbing resin excels the aforementioned drying agent in water absorbing ability. When the highly water-absorbing resin particles of the nature described above are dispersed in the polyolefinic resin used in the intermediate layers, they entail a disadvantage that the polyolefinic resin enveloping the dispersed particles shows substantially no discernible loss of hardness due to moisture absorption and possesses a very low capacity for swelling with absorbed water and are swelled with great difficulty, the highly water-absorbing resin particles dispersed therein are impeded from being swelled with absorbed water and, therefore, are restrained from manifesting the ability thereof to absorb water. Under the conditions of high humidity and high temperature generated as in the treatment using a retort, even when the multilayer structure is configurated as described above, it is difficult from the practical point of view to ensure perfect prevention of the oxygen barrier resin from absorbing water. In the multi-layer structure having the highly water-absorbing resin particles dispersed in the intermediate layers formed mainly of a polyolefinic resin, therefore, there is involved a problem that when the highly water-absorbing resin particles are relied on to absorb water from the oxygen barrier resin in a state wet with water already absorbed during the course of manufacture of the structure, the absorption of this water is effected indirectly through the medium of the hydrophobic polyolefin resin and the actual water absorption displayed by the resin particles is very inferior.

In the case of a multi-layer structure having the aforementioned highly water-absorbing resin particles dispersed in an adhesive layer of hydrophobic adhesive resin as disclosed in the specifications of Japanese Patent Application KOKAI No. 58(1983)-98,251 and No. 61(1986)-11,339, the structure shows a phenomenon of foaming in consequence of relief of pressure during the course of extrusion molding and suffers occurrence of countless fine bubbles distributed within the walls of the component layers. Consequently, the adhesive layer and further the oxygen barrier layer produce pinholes therein and, at times, fail to attain easily the object of enabling the structure to retain the oxygen barrier property. Further, the dispersion of the highly water-absorbing resin particles in the adhesive layers results in a decrease of interlaminar strength and the inclusion of the highly water-absorbing resin particles in the inner and outer adhesive layers entails a sacrifice of transparency and an increase of production cost.

The aforementioned prior arts invariably aim to prevent an oxygen barrier layer of water-sensitive resin such as EVOH from absorption of moisture and consequent adverse effects by laminating on the oxygen barrier layer or outer layer or adhesive layer made of moistureproof resin having a water-absorbing substance dispersed therein. They do not contemplate having the water-absorbing substance dispersed in the oxygen barrier layer itself.

U.S. Pat. No. 4,425,410 (filed Sept. 15, 1982) discloses a multi-layer structure which has calcium chloride, sodium chloride, sodium phosphate-di-basic, potassium carbonate, aluminum sulfate, magnesium sulfate, magnesium chloride, sodium nitrate, sodium sulfate, ammonium phosphate, or potassium bromide or sucrose dispersed as a drying agent in an oxyen barrier layer itself. U.S. Pat. No. 4,464,443 (filed Oct. 3, 1983) discloses a mutli-layer structure having an ammonium chloride drying agent dispersed in an oxygen barrier layer thereof. The drying agent used therein as described above, unlike the hydrophilic macromolecular compound which swells in consequence of water absorption, absorbs water from the environment only to form a hydrate or convert itself into an aqueous solution and, therefore, possesses an extremely low water-absorbing property as compared with the hydrophilic macromolecular compound. Once this drying agent is saturated with absorbed water, it is no longer capable of absorbing water. When the multi-layer structure which has this drying agent dispersed in the oxygen barrier layer is used under the conditions of high humidity and high temperature, particularly for a long time, it retains the oxygen barrier proper appreciably only with difficulty. Particularly when the drying agent is incorporated in the oxygen barrier layer in a large amount for the purpose of enhancing the water-absorbing effect, there ensues exactly the same problem as involved when the incorporation is made in the adhesive layer, i.e. the problem that the transparency, physical properties, etc. of the oxygen barrier layer are impaired.

SUMMARY OF THE INVENTION

An object of this invention, therefore, is to provide a multi-layer structure for packaging, which solves the problems mentioned above, permits the oxygen barrier property thereof to be retained in spite of aging, and excels in the ability to preserve wrapped contents.

Another object of this invention is to provide comparatively inexpensively a multi-layer structure for packaging, which permits the oxygen barrier property thereof to be retained to a high extent without a sacrifice of the various properties of the component layers thereof during storage and even under the condition of high humidity and high temperature generated as during sterilization by heating or during hot filling of packages.

Yet another object of this invention is to provide a multi-layer structure for packaging, which retains the interlaminar strength at a high level, avoids formation of pinholes, and possesses sufficient transparency.

To accomplish the objects described above in accordance with this invention, there is provided a multi-layer structure comprising at least one protective layer of hydrophobic resin and at least one layer of water-sensitive oxygen barrier resin, characterized in that it incorporates in the aforementioned oxygen barrier layer at least one macromolecular compound selected from the group consisting of high polymers containing hydrophilic groups and possessing a three-dimensional network structure and water-soluble macromolecular compounds containing ionizing groups. The oxygen barrier layer and the protective layer of the aforementioned structure may be formed, when necessary, in a multi-layer pattern with a layer of adhesive resin interposed therebetween.

The above and many other advantages, features and additional objects of the present invention will become apparent to those skilled in the art upon making reference to the following detailed description.

DETAILED DESCRIPTION OF THE INVENTION

As described previously, it has been known to the art to incorporate in the oxygen barrier layer of a multi-layer structure an inorganic water-absorbing substance such as calcium chloride, sodium chloride, sodium phosphate-di-basic, potassium carbonate, magnesium sulfate, magnesium chloride, potassium nitrate, ammonium phosphate, potassium bromide and ammonium chloride, or sucrose (U.S. Pat. No. 4,464,443 and U.S. Pat. No. 4,425,410). An idea of incorporating in the oxygen barrier layer a hydrophilic macromolecular compound which excels the inorganic water-absorbing substance or saccharide in water-absorbing property has never been materialized.

In the multi-layer structure of the prior art, no hydrophilic macromolecular compound has been used in the oxygen barrier layer possibly for the following reasons. Unlike the inorganic water-absorbing substance mentioned above, the hydrophilic macromolecular compound swells in consequence with absorption of water. When this compound is dispersed in the oxygen barrier layer, the oxygen barrier layer itself is swelled and softened and, consequently, rendered liable to produce pinholes therein. In consequence of the swelling, the hydrophilic macromolecular compound becomes liable to approximate to the protective layer and, as the result, passage of moisture into the oxygen barrier layer is believed to be facilitated particularly under the conditions of high humidity and high temperature. This inference finds wide recognition. Since a water-sensitive resin such as EVOH is permeated rather easily by moisture as compared with any other polyolefinic resin, it is concluded as a commonsense interpretation that the resin will cause an increase in the moisture content of the oxygen barrier layer and impair the oxygen barrier property of this layer.

The inventors, as the result of their study, have found that quite unlike what can be logically inferred from the generally accepted idea mentioned above, dispersion of a hydrophilic polymer containing hydrophilic groups and possessing a three-dimensional network structure or a water-soluble macromolecular compound containing ionizing groups in the oxygen barrier layer itself enables the oxygen barrier layer to retain the oxygen barrier property thereof to a high degree even under the conditions of high humidity and high temperature and, consequently, the aforementioned objects of this invention are attained.

Figure 1:
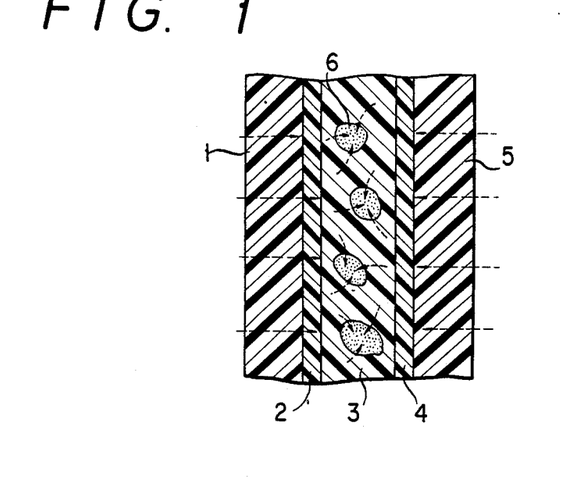
FIG. 1 is an enlarged cross-sectional view of a multi-layer structure of the present invention schematically illustrating the passage of moisture.

The function of the multi-layer structure of the present invention will be described below with reference to FIG. 1. FIG. 1 illustrates, by means of a model, the function of the multi-layer structure of the present invention. Lamellarly, this structure is composed of an outer layer 1, an adhesive layer 2, an oxygen barrier layer 3, an adhesive layer 4, and an inner layer 5. The function of the multi-layer structure is invariable when the laminar construction is otherwise than is just mentioned.

Under the conditions of high humidity and high temperature existing during the treatment in a retort as mentioned above, since the relative humidity inside and outside the container is generally 100%, the moisture-proof resin such as polyethylene gains in moisture absorption so much that the moisture begins to permeate the outer layer 1 and the inner layer 5 both made of moistureproof resin from inner and outer sides of the multi-layer structure as indicated by arrows of broken lines in FIG. 1 and gradually passes through the adhesive layers 2 and 4 into the oxygen barrier layer 3. Since the EVOH which forms the oxygen barrier layer 3 is a water-sensitive hydrophilic resin, it is permeated relatively easily by the water as compared with any other polyolefinic resin. As the result, it conforms to the generally accepted theory to conclude that the moisture content of the oxygen barrier layer 3 is increased and the oxygen permeability thereof is notably increased as well even when a hydrophilic polymer or water-soluble macromolecular compound having a high water-absorbing property or high moisture-absorbing property is dispersed in the oxygen barrier layer 3.

Quite unlike the commonsense conclusion just mentioned, however, the inventors have found that when such highly hygroscopic hydrophilic polymer or water-soluble macromolecular compound 6 as mentioned above is dispersed in the oxygen barrier layer 3 and allowed to form water-absorbing parts resembling islands in an ocean as illustrated in FIG. 1, it does not bring about any appreciable increase of the oxygen permeability and has an effect of repressing the growth of the oxygen permeability much more than when the aforementioned dispersion is made in the adhesive layers 2, 4.

Although this action of the dispersed polymer or macromolecular compound remains yet to be theoretically elucidated, it may be logically explained by the following supposition. The oxygen barrier layer 3 permits relatively easy entry of water when the highly hygroscopic hydrophilic polymer or water-soluble macromolecular compound 6 is dispersed in the oxygen barrier layer 3. The aforementioned highly hygroscopic hydrophilic polymer or water-soluble macromolecular compound 6 possesses extremely high hygroscopicity (moisture-absorbing rate) and exhibits a highly satisfactory water-retaining property thanks to its three-dimensional network structure or a structure resembling a ball of knitting yarn and to the formation of a counter-ion of the hydronium ion ($H_3^+O$) relative to the ion (such as, for example, $-COO^-$) possessed properly as a macromolecular electrolyte. It follows that the speed at which the hydrophilic polymer or water-soluble macromolecular compound 6 absorbs moisture is higher than the speed at which moisture permeates the oxygen barrier layer 3 and that the polymer or macromolecular compound 6, owing to its outstanding moisture-absorbing ability, even absorbs the water inherently present in the oxygen barrier resin and, owing to its outstanding water-retaining property, does not easily release the water once absorbed. The effect of moisture on the oxygen barrier layer 3 is manifested only on the boundary thereof with the particles of the hydrophilic polymer or water-soluble macromolecular compound. The greater part of the oxygen barrier layer, therefore, is not susceptible to the effect of moisture. As the result, the oxygen permeability is not increased so much as expected but is increased rather slightly. The aforementioned highly hygroscopic hydrophilic polymer or water-soluble macromolecular compound swells as it absorbs moisture. Immediately before the hydrophilic polymer or water-soluble macromolecular compound absorbs moisture, the EVOH which is used as the oxygen barrier resin becomes relatively soft with absorbed water. It then follows the swelling of the aforementioned hydrophilic polymer or water-soluble macromolecular compound and, therefore, avoids inhibiting the moisture-absorbing and water-retaining ability of the hydrophilic polymer or water-soluble macromolecular compound. This peculiar behavior of the EVOH also proves favorable for the aforementioned action.

In contrast, when the hydrophilic polymer or water-soluble macromolecular compound is dispersed in the adhesive layer 2 or the outer layer 1, it brings about an effect of seriously impairing the moisture proofness of the layer. Further, because these layers are generally formed of a polyolefinic resin which has a low moisture absorption and yields to substantially no decrease of hardness, they do not appreciably follow the aforementioned swelling of the hydrophilic polymer or water-soluble macromolecular compound due to absorption of moisture. Consequently, they have an effect of repressing the swelling and restraining the moisture-absorbing ability of the hydrophilic polymer or water-soluble macromolecular compound. As the result, the absorption of moisture by the hydrophilic polymer or water-soluble macromolecular compound is not so effective in repressing the passage of moisture into the oxygen barrier resin as expected. This effect is poorer and the oxygen permeability is considerably larger than when the dispersion is made in the oxygen barrier layer.

When the hydrophilic polymer or water-soluble macromolecular compound is not thoroughly dried and, in that state, is incorporated in the adhesive layer resin and extruded with an extruder, the extruded mixture is observed to foam in consequence of relief of pressure and the adhesive layer and additionally the oxygen barrier layer produce pinholes. The oxygen barrier property of the produced structure, therefore, is liable to degrade. It was expected that this phenomenon of foaming would be observed without reference to the kind of layer to be selected for incorporation of the hydrophilic polymer or water-soluble macromolecular compound. Surprisingly, the inventors have experimentally ascertained that the aforementioned phenomenon of foaming is scarcely observed when the dispersion is made in the oxygen barrier layer. What causes this selectivity of the phenomenon of foaming remains to be clarified. One of the conceivable causes therefore resides in the fact that the EVOH forming the oxygen barrier layer is a hydrophilic resin, whereas the polyolefinic resin forming the adhesive layer is a hydrophobic resin. This inference is evinced by the fact that the threshold moisture content for foaming, i.e. the moisture content of a given resin which effectively represses the phenomenon of foaming occurring when the hydrophilic polymer or water-soluble macromolecular compound is incorporated in this resin and the mixture is extruded is estimated to be about 0.6% in the case of the EVOH and about 0.08% in the case of the polyolefinic resin. Even when the hydrophilic polymer or water-soluble macromolecular compound has undergone the step of drying, it actually still contains water to some extent. Particularly when it is mixed with a hydrophobic resin, the water content of the resultant mixture more often surpasses the threshold moisture content for foaming. The EVOH is hydrophilic. It is, therefore, inferred that even when it is mixed with the hydrophilic polymer or water-soluble macromolecular compound possessing hydrophilic groups or ionizing groups, the evaporation of water is moderated and the phenomenon of foaming is repressed.

Besides, the interlaminar strength is lowered when the hydrophilic polymer or water-soluble macromolecular compound is incorporated in the adhesive layer. No such adverse effect is brought about when the incorporation is made in the oxygen barrier layer.

Now, the materials used for the component layers of the multi-layer structure of the present invention will be described in detail below.

Oxygen barrier layer:

This layer is formed of an oxygen barrier resin having an oxygen permeation coefficient of not more than $1 \times 10^{-11}$ cc.cm/cm$^2$.sec.cmHg (37° C., R.H. 0%). Examples of the material for this layer include saponified ethylene-vinyl acetate copolymers, polyamides, polyvinyl alcohol, modification products and mixtures thereof.

Among the materials enumerated above, the saponified ethylene-vinyl acetate copolymer having an ethylene content in the range of 25 to 50 mol% and a saponification degree of not less than 96% proves to be a particularly desirable selection. By increasing the ethylene content beyond 25 mol%, the molding properties such as extrusion molding property and blow molding property are improved. By holding down the ethylene content below 50 mol%, the oxygen barrier property is enhanced. Then, by increasing the saponification degree beyond 96%, the oxygen barrier property is heightened.

Protective layers (inner and outer layers):

These layers are formed of either a crystalline thermoplastic resin having a melting point of not lower than 100° C. as measured with a differential scanning calorimeter or a non-crystalline thermoplastic resin having a flow-starting point (the temperature at which the flow reaches 2 mm$^3$/sec. under the conditions of 100 kg of load and 1 mm in diameter×10 mm in length of die) is not lower than 100° C. as measured with a flow tester of KOKA type. Examples of the material for these layers include polypropylene, polystyrene, high-density to medium-density polyethylenes, low-density polyethylene, polyethylene terephthalate, polybutylene terephthalate, polycarbonates, acrylonitrile-styrene-butadiene copolymer, polyphenylene oxide, modification products and mixtures thereof, and these thermoplastic resins having such fillers as calcium carbonate, talc, and mica suitably incorporated therein.

Adhesive layer:

Examples of the material for this layer include polar group-containing modified polyolefins obtained by graft modifying polyethylene, polypropylene, or ethylene-vinyl acetate copolymer with unsaturated carboxylic acids, or unsaturated polycarboxylic acids or anhydrides thereof; ethylene-vinyl acetate copolymer and saponification products thereof; ethylene-ethylacrylate copolymer, ethylene-acrylic acid copolymer, ethylene-methacrylic acid copolymer, ionomers obtained by cross-linking such copolymers with metallic ions; and block copolymers of styrene with butadiene. These are invariably synthetic resins compatible with synthetic resins used for forming the oxygen barrier layer and the protective layers.

In accordance with this invention, in the aforementioned oxygen barrier layer, at least one of the hydrophilic polymers of a three-dimensional network structure possessing hydrophilic groups and the water-soluble macromolecular compounds possessing ionizing groups is dispersed. High polymer of a three-dimensional network structure possessing hydrophilic groups:

This is a hydrophilic high polymer which is capable of absorbing distilled water in an amount of 10 to 1,500 times its own weight and yet substantially insoluble in water. It is a macromolecular polymer made to assume a three-dimensional network structure by chemical means such as cross-linking or physical means such as is capable of conferring a quality similar to what is obtained by cross-linking. Particularly, macro-molecular network polymers which possess ionizing groups, i.e. ionized carboxyl groups ($-COO^-$) such as sodium carboxylate group ($-COONa$), potassium carboxylate group ($-COOK$), and ammonium carboxylate group ($-COONH_4$), or sulfonate group ($-SO_3^-$) are desirable examples of the polymer because they are capable of absorbing water in amounts of not less than 50 times their own weights.

The macromolecular network polymers of the foregoing description fall under two types: the synthetic type high polymers and the semisynthetic type high polymers. In the synthetic type polymers, vinyl alcohol-unsatuated carboxylic acid copolymers, isobutylene-maleic anhydride copolymer, polyvinyl alcohol, polyacrylic acid, polyacrylamide, acrylic acid-acrylamide copolymer, and polyethylene oxide which possess such hydrophilic groups as carboxyl group, sulfonic group, amide group, ether group, and hydroxyl group can be used as basic polymers.

Macromolecular network polymers having a vinyl alcohol-unsaturated carboxylic acid copolymer as a basic polymer include vinyl alcohol-acrylate type network copolymer resulting from hydrolysis of vinyl acetate-methyl acrylate copolymer and ethylene-vinyl alcohol-acrylate terpolymer type network polymers (such as, for example, a product of Sumitomo Chemical Co., Ltd. marketed under trademark designation of "Sumika-gel S type" or "SP type"). These hydrophilic network polymers excel in water-absorbing property, gel strength, transparency, compatibility with various resins, and dispersibility.

Macromolecular network polymers having an isobutylene-maleic anhydride as a basic polymer include isotutylene-maleate copolymer type network polymers (such as, for example, a product of Kuraray Co., Ltd. and marketed under trademark designation of "KI gel").

Macromolecular network polymers having polyvinyl alcohol as a basic polymer include network polymers obtained by subjecting aqueous polyvinyl alcohol solution to radiation cross-linking and macromolecular network polymers obtained by suspending polyvinyl alcohol in a non-proton type solvent and cross-linking and resultant suspension through the reaction with a cyclic acid anhydride such as maleic anhydride or phthalic anhydride (for example, a product of Nippon Synthetic Chemical Industry Co., Ltd. and marketed under trademark designation of "GP resin").

Macromolecular network polymers having a polyacrylic acid type compound as a basic polymer include macromolecular network polymers obtained by copolymerizing acrylic acid or salts thereof with a small amount of divinyl compound, macromolecular network polymers ionically cross-linked with polyvalent metallic ions, and macromolecular network polymers cross-linked by themselves through suitable selection of conditions of polymerization (such as, for example, a product of Seitetsu Kagaku Co., Ltd. marketed under trademark designation of "Aquakeep," a product of Nippon Shokubai Kagaku Kogyo Co., Lts. marketed under trademark designation of "Aqualic CA," or a product of Sumitomo Chemical Co., Ltd. marketed under trademark designation of "Sumikagel N type and NP type").

Macromolelcular network polymers having acrylic acidacrylamide copolymer as a basic polymer include acrylateacrylamide copolymer type network polymers (such as, for example, a product of Sumitomo Chemical Co., Ltd. marketed under trademark designation of "Sumikagel F type").

A product of Sumitomo marketed under trademark designation of "Sumikagel R30" is one example of the macromolecular network polymers having polyethylene oxide as a basic polymer.

Semisynthetic polymers include macromolecular network polymers obtained by graft polymerizing (meth)acrylic acid derivatives such as acrylonitrile, methyl acrylate, methyl methacrylate, and acrylamide to polysaccharides or cross-linked polysaccharides such as starch, cross-linked starch, cellulose, and cross-linked cellulose and hydrolyzing the resultant graft polymers with an alkali, macromolecular network polymers obtained by graft polymerizing acrylic acid or methacrylic acid to the aforementioned polymers and neutralizing the resultant graft polymers, and macromolecular network polymers obtained by carboxymethylating or sodium-carboxymethylating the aforementioned polysaccharides or cross-linked polysaccharides (such as, for example, a graft starch of polyacrylate produced by Sanyo Chemical Industries Co., Ltd. and marketed under trademark designation of "San-wet").

Water-soluble macromolecular compound containing ionizing groups:

This is a water-soluble high polymer or macromolecular compound whose isothermal hygroscopic curve is such that the equilibrium moisture content at a temperature of 20° C. and a relative humidity of 65% is not less than 20% by weight of the absolute dry weight. This polymer or compound is a macromolcular electrolyte containing a sodium carboxylate group (—COONa), a potassium carboxylate group (—COOK), ammonium carboxylate group (—COON$_4$), a sodium sulfonate group (—SO$_3$Na), sulfonic group (—SO$_3$H), i.e. ionizing groups which, on being ionized, produce a carboxyl group (—COO$^-$) or a sulfonate group (—SO$_3^-$).

The aforementioned water-soluble macromolecular compounds fall under the synthetic polymer type, the semi-synthetic polymer type, and the natural polymer type. Examples of the synthetic polymer type compounds include water-soluble high polymers such as polyacrylates, acrylate-acrylamide copolymers, vinyl alcohol-unsaturated carboxylate copolymers, isobutylene-anhydrous maleate copolymers, polymethallyl sulfonic acid, and salts thereof, which include said ionizing groups. Other examples include water-soluble high polymers obtained by graft polymerizing (meth)acrylic acid derivatives such as acrylonitrile, methyl acrylate, methyl methacrylate, and acrylamide to polyvinyl alcohol or ethylene-vinyl alcohol copolymer and hydrolyzing the resultant graft polymers with alkali or water-soluble high polymers obtained by graft polymerizing acrylic acid or methacrylic acid to the aforementioned polymers and neutralizing the resultant graft polymers. Polysodium acrylate and polysodium-L-glutamate, i.e. products of Nippon Kayaku Co., Ltd. marketed under trademark designations of "Pana Kayaku B" and "Pana Kayaku Bulk NP" are concrete examples. The semisynthetic polymer type compounds include carboxymethyl cellulose (CMC) obtained by sodium-carboxymethylating cellulose. The natural polymer type polymers include sodium alginate (such as, for example a product of Kimitsu Chemical Industry marketed under trademark designation of "Kimitsu-Algin").

The multi-layer structure of the present invention is produced lamellarly in two or more layers as by co-extrusion. Typical laminated structures available are shown below.

| | |
|---|---|
| Two layers: | A/(B:X) |
| Three layers: | A/(B:X)/A |
| Four layers: | A/B/(B:X)/A |
| Five layers: | A/C/(B:X)/C/A |
| | A/(B:X)/A/(B:X)/A |
| | A/(B:X)/B/(B:X)/A |
| Six layers: | A/C/B/(B:X)/C/A |
| Seven layers: | A/C/(B:X)/A/(B:X)/C/A |

[wherein A stands for a hydrophobic resin, B for an oxygen barrier resin, C for an adhesive resin, X for a hydrophilic polymer or a water-soluble macromolecular compound, and the parenthesis ( ) for a mixture of the materials indicated therein].

The mixing ratio of the oxygen barrier resin B to the hydrophilic polymer or water-soluble macromolecular compound X (by weight), B:X, is desired to fall in the range of 99.5:0.5 to 60:40, desirably 99:1 to 65:35, and more desirably 97:3 to 75:25. If the proportion of the hydrophilic polymer or water-soluble macromolecular compound, X, is less than 0.5, the macromolecular compound cannot be expected to manifest the moisture-absorbing effect thereof. Conversely, if this proportion exceeds 40, the dispersibility of the compound in the oxygen barrier resin is inferior even when the particles of the compound are sufficiently minute, with the result that the particles of the hydrophilic polymer or water-soluble macromolecular compound are distributed as conglomerated continuously within the mixed resin or the macromolecular compound is exposed from the boundary between adjacent layers and the oxygen barrier property is impaired rather than improved. The oxygen barrier layer may have other resin incorporated therein. Generally if the amount of the other resin thus incorporated exceeds 60 parts by weight based on 100 parts by weight of the oxygen barrier resin, the oxygen barrier property cannot be expected to be retained. Thus, it is desirable to keep this quality intact by limiting the amount of the other resin so incorporated below 60 parts, preferably below 45 parts.

The particles of the hydrophilic polymer or water-soluble macromolecular compound are required to have a diameter smaller than the wall thickness of the oxygen barrier layer as contained in the finished multi-layer structure. They are desired to have diameters of not more than 85% of the aforementioned wall thickness. Generally these diameters fall in the range of 5 to 80$\mu$. If the particles of the aforementioned macromolecular compound have diameters larger than the wall thickness of the oxygen barrier layer, the macromolecular compound is exposed from the boundary surface of the layer is not buried in the oxygen barrier resin as desired.

Thus, the incorporated macromolecular compound goes to impairing rather than improving the oxygen barrier property.

To ensure production of the finished structure contemplated by this invention as described above, it is desirable to use the hydrophilic polymer or water-soluble macromolecular compound of an amply minute particle diameter as the raw material. Alternatively, the hydrophilic polymer or water-soluble macromolecular compound of a relatively large particle diameter (such as, for example, $200\mu$) may be treated in a roll kneader or a kneading extruder, jointly with the oxygen barrier resin, under properly adjusted conditions of kneading or fusing so as to be given a suitably adjusted fine particle diameter.

The multi-layer structure of this invention can keep the oxygen barrier property in an extremely desirable state in spite of aging and even under the conditions of high humidity and high temperature. Thus, it has an excellent ability to preserve contents wrapped therein. Further, since the object of ensuring oxygen barrier is attained by having the hydrophilic polymer or water-soluble macromolecular compound incorporated not in the inner and outer layers but only in the sole oxygen barrier layer, the multi-layer polymeric structure of this invention has the salient economic and operational merit of economizing the consumption of the expensive and highly hygroscopic hydrophilic polymer or water-soluble macromolecular compound.

Thus, the multi-layer structure of this invention can be advantageously used as bottles, tubes, cups, bags, and other similar containers for holding such foodstuffs as mayonnaise, ketchup, edible oils, fruits, vegetables, cooling food, soup, jam, and fruit drinks, medicines such as blood, substitute blood plasma, and intravenous solution, other liquid substances, viscous substances, and powdery substances, and as packing materials, sealing materials, wraps, etc. for the aforementioned containers.

These end products of the multi-layer polymeric structure can be suitably manufactured by blow molding, injection molding, extrusion molding, vacuum molding, and compression molding.

Unlike the conventional multi-layer bottles which incorporate therein a drying agent of calcium chloride and consequently suffer from impaired transparency, the multi-layer polymeric structure of this invention does not require incorporation of a large amount of the inorganic drying agent for the improvement of the intended effect. Thus, it finds satisfactory utility in containers such as multi-layer bottles for holding foodstuffs like dressing and intravenous solution like physiological saline water and high-calorie fluids which are desired to have transparency enough for the contents to be seen through from outside.

For this invention, the provision of multi-layer structures possessing the transparency of the kind mentioned above constitutes one of the objects thereof. However, this invention is not limited to the multi-layer structures possessing transparency but may be applied to multi-layer structures which are translucent or even opaque.

Now, the present invention will be described more specifically below with reference to working examples and comparative experiments.

Figure 2:
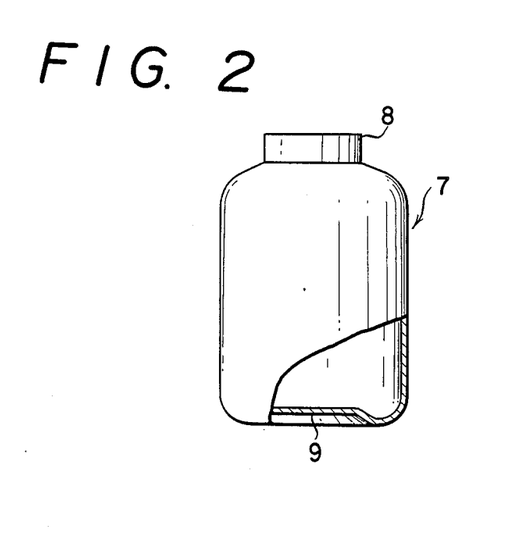
FIG. 2 is a partially cutaway front view illustrating a typical multi-layer bottle embodying this invention.

Examples 1-6:

From the materials listed in Table 1, those of a varying combination indicated in Table 2 were selected. In the oxygen barrier resin B in the combination, a hydrophilic polymer of a three-dimensional network structure containing hydrophilic groups or water-soluble macromolecular compound, $X_1$, $X_2$, $X_5$, $X_6$, or $X_7$, was incorporated. Then, the materials were severally melted and kneaded in extruding machines. While the materials thus prepared were to be forwarded from the extruding machines to an extrusion die, the material $A_1$ for the inner and outer layers and the material $C_1$ for the inner and outer adhesive layers were divided into two paths. Thereafter, the flows of the materials were joined in a five-layer structure indicated in Table 2 within the extrusion die (Examples 1-5) and the tubular parison was extruded from the die face. In one other combination, the material $A_2$ for the inner and outer layers was divided into two paths and the flows of the materials were joined in a three-layer structure of $A_2/(B:C_2:X_6)/A_2$ within the extrusion die (Example 6). Then, the parison in the plasticated state were each disposed in a split type mold adapted to enclose therein a container mold cavity on being closed. The mold was closed to have the lower end of the bottomless parison pinched and joined with the mold so as to provide the parison with a bottom. Then, the bottom parison was blow molded by introduction therein of compressed air. The mold was cooled and the shaped article was removed from the mold. Consequently, multi-layer bottles having an inner volume of 500 cc and shaped as illustrated in FIG. 1 and FIG. 2 were obtained.

Each of the multi-layer bottles 7 obtained by the method of molding described above had a mouth part 8 in the upper part and had, in the bottom part thereof, a pinch-off part 9 formed by being pinched and joined during the course of the molding. The wall of the bottle 7, as illustrated in FIG. 1, was composed of a total of five layers, i.e. an inner layer 5 and an outer layer 1 both made of the material $A_1$, an oxygen barrier layer 3 made of a material of $(B:X_1)$, $(B:X_5)$, $(B:X_2)$, $(B:X_6)$, or $(B:X_7)$, an inner adhesive layer 4 and an outer adhesive layer 2 both made of the material $C_1$. The wall of the multi-layer bottle 7 of Example 6 was composed of an inner layer and an outer layer both made of the material $A_2$ and an intervening oxygen barrier layer made of the material $(B:C_2:X_6)$.

In the examples described above, incorporation into the oxygen barrier layer of a high polymer of a three-dimensional network structure containing hydrophilic groups or a water-soluble macromolecular compound containing ionizing groups was effected by a procedure which comprised preparatorily melting and kneading part of the oxygen barrier resin with the network polymer or the water-soluble macromolecular compound in a mixing roll machine thereby obtaining a master batch of pellets and subsequently mixing and melting the remaining part of the oxygen barrier resin with the master batch until uniform dispersion. This procedure was used in entirely the same manner in each of the following working examples for incorporation of other substance in the resins of the component layers.

Comparative Experiment 1:

A five-layer bottle was obtained by following the procedure of Example 1 and using the same mold, expecting the incorporation of a high polymer of a three-dimensional network structure containing hydrophilic groups was omitted.

Comparative Experiment 2:

A five-layer bottle was obtained by following the procedure of Example 1 and using the same mold, expecting the incorporation of a high polymer of a three-dimensional network structure containing hydrophilic groups was made in the inner adhesive layer and the outer adhesive layer.

Comparative Experiments 3-5:

Five-layer bottles were obtained by following the procedure of Example 1 and using the same mold, excepting calcium chloride, ammonium chloride, and potassium carbonate were respectively used in the place of a high polymer of a three-dimensional network structure containing hydrophilic groups.

Comparative Experiment 6:

A five-layer bottle was obtained by following the procedure of Example 1 and using the same mold, excepting a hydrophilic network polymer having a relatively large diameter was used instead.

Comparative Experiment 7:

A five-layer bottle was obtained by following the procedure of Comparative Experiment 4 and using the same mold, excepting the wall thickness of the oxygen barrier layer was changed.

Comparative Experiment 8:

A five-layer bottle was obtained by following the procedure of Example 3 and using the same mold, excepting the incorporation of a hydrophilic network polymer was omitted.

Comparative Experiment 9:

A five-layer bottle was obtained by following the procedure of Example 4 and using the same mold, excepting the incorporation of a water-soluble macromolecular compound containing ionizing groups was omitted.

Comparative Experiments 10-12:

Five-layer bottles were obtained by following the procedure of Example 4 and using the same mold, excepting calcium chloride, ammonium chloride, and potassium carbonate were respectively used in the place of the water-soluble macromolecular compound containing ionizing groups.

Comparative Experiment 13:

A five-layer bottle was obtained by following the procedure of Example 4 and using the same mold, excepting polyvinyl alcohol (POVAL), a water-soluble macromolecular compound possessing no ionizing group, was used in the place of the water-soluble macromolecular compound containing ionizing groups.

TABLE 1

| Resin | Composition |
|---|---|
| $A_1$ | Polypropylene (product of Mitsubishi Petro-Chemical Co., Ltd. marketed under trademark designation of "Noblen EX-6") |
| $A_2$ | Linear low-density polyethylene (product of Sumitomo Chemical Co., Ltd. marketed under trademark designation of "Sumikasen L, FA102-O") |
| $A_3$ | High-density polyethylene (product of Mitsubishi Petro-Chemical Co., Ltd. marketed under trademark designation of "Yukalon HD-BZ50") |
| B | Saponified ethylene-vinyl acetate copolymer (ethylene content 29 mol %, saponification degree 99%) |
| $C_1$ | Graft-modified polypropylene |
| $C_2$ | Saponified ethylene-vinyl acetate copolymer (ethylene content 89 mol %, saponification degree 90%) |
| $X_1$ | Vinyl alcohol-acrylate copolymer type network polymer (product of Sumitomo Chemical Co., Ltd. marketed under trademark designation of "Sumikagel SP-510") having grain size of $10\mu$ |
| $X_2$ | Vinyl alcohol-acrylate copolymer type network polymer (product of Sumitomo Chemical Co., Ltd. marketed under trademark designation of "Sumikagel SP-520") having grain size of $20\mu$ |
| $X_3$ | Vinyl alcohol-acrylate copolymer type network polymer (product of Sumitomo Chemical Co., Ltd. marketed under trademark designation of "Sumikagel SP-50") having grain size of $200\mu$ |
| $X_4$ | Mixture of 50% by weight of vinyl alcohol-acrylate copolymer type network polymer (product of Sumitomo Chemical Co., Ltd. marketed under trademark designation of "Sumikagel SP-510") and 50% by weight of ethylene-vinyl acetate copolymer (ethylene content 60% by weight, melt index 60 (JIS K-6760) having grain size of $10\mu$ |
| $X_5$ | Polyacrylate type network polymer (product of Sumitomo Chemical Co., Ltd. marketed under trademark designation of "Sumikagel NP-1010") having grain size of $10\mu$ |
| $X_6$ | Polysodium acrylate (product of Nippon Kayaku Co., Ltd. marketed under trademark designation of "Panakayaku Bulk NP") |
| $X_7$ | Carboxymethyl cellulose (product of Iwai Chemical) having grain size of $60\mu$ |
| $D_1$ $D_1'$ | Calcium chloride |
| $D_2$ $D_2'$ | Ammonium chloride |
| $D_3$ $D_3'$ | Potassium carbonate |
| E | Poval (product of Nippon Synthetic Chemical Industry Co., Ltd. marketed under trademark designation of "Gosenol GL05") |

The multi-layer bottles obtained in Examples 1–6 and Comparative Experiments 1–13 were tested for oxygen permeability (cc/m$^2$·24 hrs.). The same bottles, filled with hot water at 80° C. and sealed along the mouth parts with aluminum film, were treated in a retort at 120° C. for 30 minutes and subsequently tested again for oxygen permeability. The results were as shown in Table 2.

TABLE 2

| | Layer construction | | | | | | | |
|---|---|---|---|---|---|---|---|---|
| | Inner layer | | Inner adhesive layer | | Oxygen barrier layer | | Outer adhesive layer | |
| No. | Resin | W.T. ($\mu$) | Resin | W.T. ($\mu$) | Resin | W.T. ($\mu$) | Resin | W.T. ($\mu$) |
| Examples | | | | | | | | |
| 1 | $A_1$ | 300 | $C_1$ | 15 | $B:X_1$ | 30 | $C_1$ | 15 |
| 2 | $A_1$ | 300 | $C_1$ | 15 | $B:X_5$ | 30 | $C_1$ | 15 |
| 3 | $A_1$ | 300 | $C_1$ | 10 | $B:X_2$ | 30 | $C_1$ | 10 |
| 4 | $A_1$ | 554 | $C_1$ | 25 | $B:X_6$ | 75 | $C_1$ | 27 |
| 5 | $A_1$ | 545 | $C_1$ | 27 | $B:X_7$ | 76 | $C_1$ | 31 |
| 6 | $A_2$ | 300 | — | — | $B:C_2:X_6$ | 30 | — | — |
| Comparative experiments | | | | | | | | |
| 1 | $A_1$ | 300 | $C_1$ | 15 | B | 30 | $C_1$ | 15 |
| 2 | $A_1$ | 300 | $C_1:X_1$ | 15 | B | 30 | $C_1:X_1$ | 15 |
| 3 | $A_1$ | 300 | $C_1$ | 15 | $B:D_1$ | 30 | $C_1$ | 15 |

TABLE 2-continued

| | | | | | | | | |
|---|---|---|---|---|---|---|---|---|
| 4 | $A_1$ | 300 | $C_1$ | 15 | $B:D_2$ | 30 | $C_1$ | 15 |
| 5 | $A_1$ | 300 | $C_1$ | 15 | $B:D_3$ | 30 | $C_1$ | 15 |

| | Layer construction | | Oxygen permeability (cc/m² · 24 hr.) | | | | Trans- parency (%) |
|---|---|---|---|---|---|---|---|
| | Outer layer | | Before retort | | | After retort | |
| No. | Resin | W.T. (μ) | 30° C.* 90% R.H | 30° C.* 80% R.H. | 30° C.* 50% R.H. | 30° C.* 50% R.H. | |
| Examples | | | | | | | |
| 1 | $A_1$ | 300 | 0.6 | 0.5 | 0.3 | 1.0 | 88 |
| 2 | $A_1$ | 300 | 0.5 | 0.4 | 0.3 | 0.9 | 88 |
| 3 | $A_1$ | 300 | — | — | 0.3 | 1.0 | 87 |
| 4 | $A_1$ | 357 | — | — | 0.1 | 0.3 | 62 |
| 5 | $A_1$ | 321 | — | — | 0.1 | 0.4 | 63 |
| 6 | $A_2$ | 300 | — | — | 0.4 | 0.8 | 88 |
| Comparative experiments | | | | | | | |
| 1 | $A_1$ | 300 | 3.0 | 1.5 | 0.3 | 13 | 89 |
| 2 | $A_1$ | 300 | 1.0 | 0.8 | 0.3 | 3 | 80 |
| 3 | $A_1$ | 300 | 2.0 | 1.0 | 0.3 | 10 | 70 |
| 4 | $A_1$ | 300 | 1.8 | 0.9 | 0.3 | 9.5 | 71 |
| 5 | $A_1$ | 300 | 1.9 | 1.0 | 0.3 | 10 | 73 |

| | Layer construction | | | | | | | |
|---|---|---|---|---|---|---|---|---|
| | Inner layer | | Inner adhesive layer | | Oxygen barrier layer | | Outer adhesive layer | |
| No. | Resin | W.T. (μ) | Resin | W.T. (μ) | Resin | W.T. (μ) | Resin | W.T. (μ) |
| Comparative experiments | | | | | | | | |
| 6 | $A_1$ | 300 | $C_1$ | 10 | $B:X_3$ | 30 | $C_1$ | 10 |
| 7 | $A_1$ | 300 | $C_1$ | 10 | $B:X_3$ | 18 | $C_1$ | 10 |
| 8 | $A_1$ | 300 | $C_1$ | 10 | B | 18 | $C_1$ | 10 |
| 9 | $A_1$ | 554 | $C_1$ | 25 | B | 75 | $C_1$ | 27 |
| 10 | $A_1$ | 554 | $C_1$ | 25 | $B:D_1'$ | 75 | $C_1$ | 27 |
| 11 | $A_1$ | 554 | $C_1$ | 25 | $B:D_2'$ | 75 | $C_1$ | 27 |
| 12 | $A_1$ | 554 | $C_1$ | 25 | $B:D_3'$ | 75 | $C_1$ | 27 |
| 13 | $A_1$ | 554 | $C_1$ | 25 | B:E | 75 | $C_1$ | 27 |

| | Layer construction | | Oxygen permeability (cc/m² · 24 hr.) | | | | Trans- parency (%) |
|---|---|---|---|---|---|---|---|
| | Outer layer | | Before retort | | | After retort | |
| No. | Resin | W.T. (μ) | 30° C.* 90% R.H. | 30° C.* 80% R.H. | 30° C.* 50% R.H. | 30° C.* 50% R.H. | |
| Comparative experiments | | | | | | | |
| 6 | $A_1$ | 300 | — | — | 0.3 | 15 | 80 |
| 7 | $A_1$ | 300 | — | — | 0.6 | 18 | 89 |
| 8 | $A_1$ | 300 | — | — | 0.6 | 20 | 90 |
| 9 | $A_1$ | 357 | — | — | 0.1 | 3.0 | 64 |
| 10 | $A_1$ | 357 | — | — | 0.1 | 2.0 | 45 |
| 11 | $A_1$ | 357 | — | — | 0.1 | 1.8 | 46 |
| 12 | $A_1$ | 357 | — | — | 0.1 | 1.8 | 45 |
| 13 | $A_1$ | 357 | — | — | 0.1 | 5.0 | 62 |

W.T. = Wall thickness
*Conditions for determination of oxygen permeability
In the preceding table, the mixing ratios of the components of the mixtures indicated were as follows.
$B:X_1 = 95:5$   $B:X_7 = 95:5$   $B:D = 95:5$
$B:X_2 = 95:5$   $B:D_1 = 95:5$   $B:D_2' = 90:10$
$B:X_3 = 95:5$   $B:D_1' = 90:10$   $B:D_3 = 95:5$
$B:X_5 = 95:5$   $B:E = 90:10$   $B:D_3' = 90:10$
$B:X_6 = 95:5$   $B:C_2:X_6 = 90:5:5$ The same bottles were tested for transparency (%). The results were as shown in Table 2. The test for transparency was carried out by cutting a test piece from the barrel wall of a given bottle and measured for total light transmittance (filter 570 mμ), using a photoelectric colorimeter (product of Elmer Optics marketed under trademark designation of "Elmer AE-22") in accordance with JIS K-6714.

It is noted from Table 2 that the multi-layer bottles obtained in Examples 1 and 2, unlike those of Comparative Experiments 1, 3 to 5, showed no appreciable change of oxygen permeability before and after the treatment in the retort and they showed smaller change than the bottle of Comparative Experiment 2 which had the hydrophilic network polymer incorporated in the inner and outer adhesive layers.

It is also noted from the results of Example 3, Comparative Experiments 6 and 7 that the effect of the present invention cannot be expected where the particles of the network high polymer have diameters greater than the wall thickness of the oxygen barrier layer.

The multi-layer bottles obtained in Examples 4 and 5, unlike those of Comparative Experiments 8–13, showed no appreciable change of oxygen permeability before and after the treatment in the retort and possessed higher transparency than the multi-layer bottles of Comparative Experiments 10-12 which had calcium chloride, ammonium chloride, and potassium carbonate incorporated in the respective oxygen barrier layers. It is further noted from the results of Comparative Experiment 13 that even when a water-soluble macromolecular compound is incorporated in the oxygen barrier layer, the effect of the present invention cannot be expected where the compound contains no ionizing group.

Examples 7-8:

From the materials listed in Table 1, those of combinations indicated in Table 3 were selected. In the oxygen barrier resin B of the multi-layer structure, the high polymer $X_1$ of a three-dimensional network structure containing hydrophilic groups and the adhesive resin $C_2$ were incorporated. Then the selected materials were joined in three-layer forms, $A_2/(B:X_1:C_2)/A_2$ (Example 7) and $A_3/(B:X_1:C_2)/A_3$ (Example 8). Then, three-layer bottles were obtained by following the procedure of Example 6 and using the same mold.

Comparative Experiments 14-15:

Three-layer bottles were obtained by following the procedure of Example 7 and using the same mold, excepting the incorporation of the network polymer was omitted.

The multi-layer bottles obtained in Examples 7-8 and Comparative Experiments 14-15 were tested for oxygen permeability (cc/m$^2$·24 hrs.) and transparency (%). The same bottles, filled with hot water at 80° C. and sealed along the mouth parts with aluminum film, were subjected to treatment in a retort at 110° C. for 40 minutes and then tested again for oxygen permeability. The results were as shown in Table 3.

It is noted from the results of Examples 7 and 8 that by incorporating an adhesive resin in the oxygen barrier layer, there is obtained a three-layer bottle in which satisfactory adhesive strength is produced between the oxygen barrier layer and the inner and outer layers without using any intervening adhesive layer. The results further imply clearly that a two-layer structure of sufficient adhesive strength between the two layers can be similarly produced. As the adhesive resin, the resin used in the aforementioned adhesive layer can be used. Where the incorporation of the network polymer containing hydrophilic groups in the oxygen barrier layer was omitted (Comparative Experiments 14-15), the oxygen permeability was notably large after the treatment in the retort as compared with that before the treatment.

Examples 9-10:

From the materials listed in Table 1, those of the combinations indicated in Table 4 were selected. Five-layer bottles using these materials were obtained by following the procedure of Example 1 and using the same mold, excepting the network polymer $X_4$ containing hydrophilic groups was incorporated in the oxygen barrier layer in a proportion of 10% (Example 9) or 17% (Example 10).

The network polymer $X_4$ used therein which had a moisture content of 66% (measured at 190° C.) before drying was dried preparatorily in a vacuum drier at 60° C. for 24 hours to have the moisture content adjusted to 3.1% (measured at 190° C.). The measurement of the moisture content was carried out using a coulometric titration type digital microanalyzer, Model CA-02, provided with an evaporator VA-02 (made by Mitsubishi Chemical Industries, Ltd.).

In the five-layer bottles obtained in Examples 9-10, absolutely no sign of bubbling was detected.

Comparative Experiments 16-17:

Five-layer bottles were obtained by following the procedures of Examples 9-10 and using the same mold, excepting the network polymer $X_4$ containing hydrophilic groups was incorporated in the inner adhesive layer and the outer adhesive layer each in a proportion of 10% (Comparative Experiment 16) and 17% (Comparative Experiment 17). The adjustment of moisture content of the network polymer was carried out in entirely the same manner. The five-layer bottles obtained in Comparative Experiments 16-17 both showed a sign of bubbling.

TABLE 3

| | Layer construction | | | | | | Oxygen permeability (cc/m$^2$ · 24 hr.) | | |
| | Inner layer | | Oxygen barrier layer | | Outer layer | | Before retort (30° C., 50% R.H.)* | After retort (30° C., 50% R.H.)* | Transparency (%) |
| No. | Resin | W.T. (μ) | Resin | W.T. (μ) | Resin | W.T. (μ) | | | |
| --- | --- | --- | --- | --- | --- | --- | --- | --- | --- |
| Example 7 | $A_2$ | 300 | $B:C_2:X_1$ | 30 | $A_2$ | 300 | 0.4 | 0.8 | 88 |
| Example 8 | $A_3$ | 300 | $B:C_2X_1$ | 30 | $A_3$ | 300 | 0.4 | 0.8 | 30 |
| Comparative Experiment 14 | $A_2$ | 300 | $B:C_2$ | 30 | $A_2$ | 300 | 0.4 | 15 | 89 |
| Comparative Experiment 15 | $A_3$ | 300 | $B:C_2$ | 30 | $A_3$ | 300 | 0.4 | 14 | 29 |

W.T. = Wall thickness
*Conditions for determination of oxygen permeability
In the preceding table, the mixing ratios of the components of the mixture indicated were as follows.
$B:C_2:X_1$ = 85:5:10
$B:C_2$ = 85:15

TABLE 4

| | Inner layer | | Inner adhesive layer | | Oxygen barrier layer | | Outer adhesive layer | | Outer layer | |
| No. | Resin | W.T. (μ) | Resin | W.T. (μ) | Resin | W.T. (μ) | Resin | W.T. (μ) | Resin | W.T. (μ) |
| --- | --- | --- | --- | --- | --- | --- | --- | --- | --- | --- |
| Example 9 | $A_1$ | 300 | $C_1$ | 15 | $B:X_4$ | 30 | $C_1$ | 15 | $A_1$ | 300 |
| Example 10 | $A_1$ | 300 | $C_1$ | 15 | $B:X_4$ | 30 | $C_1$ | 15 | $A_1$ | 300 |
| Comparative Experiment 16 | $A_1$ | 300 | $C_1:X_4$ | 15 | B | 30 | $C_1:X_4$ | 15 | $A_1$ | 300 |
| Comparative | $A_1$ | 300 | $C_1:X_4$ | 15 | B | 30 | $C_1:X_4$ | 15 | $A_1$ | 300 |

TABLE 4-continued

| | Inner layer | | Inner adhesive layer | | Oxygen barrier layer | | Outer adhesive layer | | Outer layer | |
|---|---|---|---|---|---|---|---|---|---|---|
| No. | Resin | W.T. (μ) | Resin | W.T. (μ) | Resin | W.T. (μ) | Resin | W.T. (μ) | Resin | W.T. (μ) |
| Experiment 17 | | | | | | | | | | |

While the present invention has been described by means of specific embodiments thereof, it is to be understood that numerous changes and modifications may be made therein without departing from the spirit and scope of the invention as defined in the appended claims.

What we claim is:

1. A multi-layer polymeric structure comprising at least one protective layer of a hydrophobic, thermoplastic resin selected from the group consisting of a polypropylene, polystyrene, high-density to medium-density polyethylenes, low-density polyethylene, polyethylene terephthalate, polybutylene terehthalate, polycarbonates, acrylonitrile-styrene-butadiene copolymer, polyphenylene oxide, modification products and mixtures thereof, and these thermoplastic resins having filler or fillers suitably incorporated therein and at least one layer of a water-sensitive oxygen barrier resin having an oxygen permeation coefficient of not more than $1 \times 10^{-11}$ cc·cm/cm$^2$·sec·cmHg at the conditions of 37° C., R.H. 0%, the improvement which comprises the incorporation in said oxygen barrier layer of at least one macromolecular compound selected from the group consisting of (a) high polymers of a three-dimensional network structure containing hydrophilic groups, said high polymer being a network polymer composed of a basic polymer selected from the group consisting of vinyl alcohol-unsaturated carboxylic acid copolymers, isobutylene-maleic anhydride copolymer, polyacrylic acid, acrylic acid-acrylamide copolymer, salts of said copolymers, polyvinyl alcohol, polyacrylamide, and polyethylene oxide, and a semisynthetic network polymer selected from the group consisting of network polymers obtained by graft polymerizing a (meth) acrylic acid derivative selected from the group consisting of acrylonitrile, methyl acrylate, methyl methacrylate, and acrylamide to polysaccharides or cross-linked polysaccharides and hydrolyzing the resultant graft polymers with an alkali or graft polymerizing acrylic acid or methacrylic acid to said polysaccharides or cross-linked polysaccharides and neutralizing the resultant graft polymers and network polymers obtained by carboxymethylating or sodium-carboxymethylating polysaccharides or cross-linked polysaccharides, and (b) water-soluble macromolecular compounds containing ionizing groups, said water-soluble macromolecular compounds being selected from the group consisting of polyacrylates, acrylate-acrylamide copolymers, vinyl alcohol unsaturated carboxylate copolymers, isobutylene-anhydrous maleate copolymers, polymethallyl-sulfonic acid and salts thereof, carboxymethyl cellulose, sodium alginate, high polymers obtained by graft polymerizing a (meth) acrylic acid derivative selected from the group consisting of acrylonitrile, methyl acrylate, methyl methacrylate, and acrylamide to polyvinyl alcohol or ethylene-vinyl alcohol copolymers and hydrolizing the resultant graft polymers with an alkali or graft polymerizing acrylic acid or methacrylic acid to said polymers and neutralizing the resultant graft polymers, wherein said macromolecular compound is in the form of particles having diameters of not more than 85% of the wall thickness of said oxygen barrier layer and is incorporated in said oxygen barrier layer in a proportion such that the ratio of oxygen barrier resin to said macromolecular compound falls in the range of 99.5:0.5 to 60:40.

2. The multi-layer structure of claim 1, wherein said oxygen barrier layer is formed of one member selected from the group consisting of saponified ethylene-vinyl acetate copolymer, polyamide, polyvinyl alcohol, modification products thereof, and mixtures thereof.

3. The multi-layer structure of claim 1, which further comprises a layer of adhesive resin, through the medium of which said protective layer and said oxygen barrier layer are joined to each other in a laminated form.

4. The multi-layer structure of claim 1, wherein said oxygen barrier layer further incorporates therein adhesive resin.

5. The multi-layer structure of claim 3 or claim 4, wherein said adhesive resin is selected from the group consisting of polar group-containing modified polyolefins obtained by graft modifying polyethylene, polypropylene or ethylene-vinyl acetate copolymer with unsaturated carboxylic acids, or unsaturated polycarboxylic acids or anhydrides thereof; ethylene-vinyl acetate copolymer and saponification product thereof; ethylene-ethyl acrylate copolymer, ethylene-acrylic acid copolymer, ethylene-methacrylic acid copolymer, and ionomers having metallic ions cross-linked thereto; and block copolymer of styrene with butadiene.

6. The multi-layer structure of claim 1, wherein said component layers of said structure are laminated by co-extrusion.

* * * * *

UNITED STATES PATENT AND TRADEMARK OFFICE
CERTIFICATE OF CORRECTION

PATENT NO. : 4,753,845
DATED : June 28, 1988
INVENTOR(S) : Takehiko Sumi, Kazuya Matsumoto It is certified that error appears in the above-identified patent and that said Letters Patent is hereby corrected as shown below:

Column 9, line 48, "$-COON_4$" should read -- $-COONH_4$ --;

Column 15, line 5 from the bottom of Table 2, "B:D = 95:5 should be -- $B:D_2$ = 95:5 --; and Column 19, line 20, "polybutylene terehthalate" should read -- polybutylene terephthalate --.

Signed and Sealed this

Twenty-fourth Day of January, 1989

Attest:

DONALD J. QUIGG

Attesting Officer　　　Commissioner of Patents and Trademarks